(12) United States Patent
Holtmanns et al.

(10) Patent No.: US 10,887,170 B2
(45) Date of Patent: Jan. 5, 2021

(54) METHOD AND APPARATUS FOR MANAGING DEVICES

(71) Applicant: Nokia Technologies Oy, Espoo (FI)

(72) Inventors: Silke Holtmanns, Klaukkala (FI); Rune Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/772,349

(22) PCT Filed: Mar. 5, 2013

(86) PCT No.: PCT/FI2013/050236
§ 371 (c)(1),
(2) Date: Sep. 2, 2015

(87) PCT Pub. No.: WO2014/135737
PCT Pub. Date: Sep. 12, 2014

(65) Prior Publication Data
US 2016/0014253 A1 Jan. 14, 2016

(51) Int. Cl.
*H04W 4/60* (2018.01)
*H04L 12/24* (2006.01)
(Continued)

(52) U.S. Cl.
CPC .......... *H04L 41/082* (2013.01); *H04L 67/125* (2013.01); *H04L 67/34* (2013.01);
(Continued)

(58) Field of Classification Search
CPC ..... H04W 12/06; H04W 12/08; H04W 12/04; H04W 84/12; H04W 88/06; H04W 48/18; H04W 4/001
See application file for complete search history.

(56) References Cited

U.S. PATENT DOCUMENTS

| | | | |
|---|---|---|---|
| 2003/0126298 A1* | 7/2003 | Redford | H04L 12/2898 709/250 |
| 2005/0009563 A1* | 1/2005 | Stenmark | H04W 8/24 455/558 |

(Continued)

FOREIGN PATENT DOCUMENTS

CN 101252434 A 8/2008

OTHER PUBLICATIONS

International Search Report and Written Opinion received for corresponding Patent Cooperation Treaty Application No. PCT/FI2013/050236, dated Nov. 28, 2013, 16 pages.

(Continued)

*Primary Examiner* — Quan M Hua
(74) *Attorney, Agent, or Firm* — Laine IP OY (57) ABSTRACT

In accordance with an example embodiment of the present invention, there is provided an apparatus, comprising a transceiver arranged to insertably interface with an integrated module, at least one processing core configured to enable the integrated module to be connected, via the apparatus, to a network, the transceiver being configured to receive from the integrated module information enabling the apparatus to become an endpoint of a connection to a network node, and the at least one processing core being configured to receive, using the connection, a computer program for operating the apparatus. In some embodiments, the integrated module comprises a universal integrated circuit card and a secure execution environment.

5 Claims, 5 Drawing Sheets

(51) Int. Cl.
  *H04W 8/18* (2009.01)
  *H04L 29/08* (2006.01)
  *H04W 4/50* (2018.01)
  *H04W 12/06* (2009.01)
  *H04M 1/725* (2006.01)
(52) U.S. Cl.
  CPC ......... *H04M 1/72527* (2013.01); *H04W 4/50* (2018.02); *H04W 8/183* (2013.01); *H04W 12/0608* (2019.01)

(56) References Cited

U.S. PATENT DOCUMENTS

| | | | | |
|---|---|---|---|---|
| 2006/0039564 | A1* | 2/2006 | Rao | G06F 21/572 380/270 |
| 2007/0015538 | A1* | 1/2007 | Wang | H04M 1/72525 455/558 |
| 2007/0288752 | A1* | 12/2007 | Chan | G06F 21/34 713/171 |
| 2008/0271023 | A1 | 10/2008 | Bone et al. | |
| 2011/0003580 | A1 | 1/2011 | Belrose et al. | |
| 2011/0047257 | A1* | 2/2011 | Lee | G06F 8/61 709/223 |
| 2011/0222549 | A1 | 9/2011 | Connelly et al. | |
| 2012/0115455 | A1 | 5/2012 | Rao | |

OTHER PUBLICATIONS

"Smart Cards; Embedded UICC; Requirements Specification", ETSI TC SCP Meeting #58, SCP(13)000049r1, ETSI TS 103 383, V2.0.0, Feb. 7-8, 2013, pp. 1-20.

Extended European Search Report received for corresponding European Patent Application No. 13877299.1, dated Sep. 26, 2016, 5 pages.

* cited by examiner

METHOD AND APPARATUS FOR MANAGING DEVICES

RELATED APPLICATION

This application was originally filed as PCT Application No. PCT/FI2013/050236 filed Mar. 5, 2013.

TECHNICAL FIELD

The present application relates generally to device management, such as updates to subscriber devices.

BACKGROUND

Subscriber devices, such as for example laptop computers, tablet computers, cellular telephones, personal digital assistants, PDAs and smartphones, are furnished with varying capabilities. Some subscriber devices comprise machine-to-machine, M2M, devices such as automated metering devices and telematics devices.

Subscriber devices may comprise two distinct processing environments, such as for example a processor or digital signal processor in the device, and a distinct module-based processing environment, which may be removable. A module-based processing environment, which may be less capable of data processing than a processor comprised in the device, may be tasked with functions including management of an identity of the device, authentication and participation in billing.

Devices comprising hardware and software elements may be upgraded along their lifetimes to enable the devices to perform different or enhanced functions. Upgrades may comprise operating system upgrades, application installations and widget installations, for example.

SUMMARY

Various aspects of examples of the invention are set out in the claims.

According to a first aspect of the present invention, there is provided an apparatus, comprising a transceiver arranged to insertably interface with an integrated module, at least one processing core configured to enable the integrated module to be connected, via the apparatus, to a network, the transceiver being configured to receive from the integrated module information enabling the apparatus to become an endpoint of a connection to a network node, and the at least one processing core being configured to receive, using the connection, a computer program for operating the apparatus.

According to a second aspect of the present invention, there is provided a method, comprising interfacing an apparatus with an integrated module, enabling the integrated module to be connected, via the apparatus, to a network, receiving from the integrated module information enabling the apparatus to become an endpoint of a connection to a network node, and receiving, using the connection, a computer program for operating the apparatus.

According to a third aspect of the present invention, there is provided an integrated module, comprising a transceiver arranged to insertably interface with a terminal device, processing circuitry configured to request a connection from the integrated module to a subscription management server via the terminal device, the transceiver being configured to provide to the terminal device information enabling the terminal device to become an endpoint of a connection to a network node, wherein the information is at least in part based on first information received in the integrated module from the subscription management server.

According to a fourth aspect of the present invention, there is provided a method, comprising interfacing an integrated module with a terminal device, requesting a connection from the integrated module to a subscription management server via the terminal device, and providing to the terminal device information enabling the terminal device to become an endpoint of a connection to a network node, wherein the information is at least in part based on first information received in the integrated module from the subscription management server.

According to further aspects of the invention, computer programs are provided, the computer programs being configured to cause methods in accordance with the second and fourth aspects to be performed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1A:
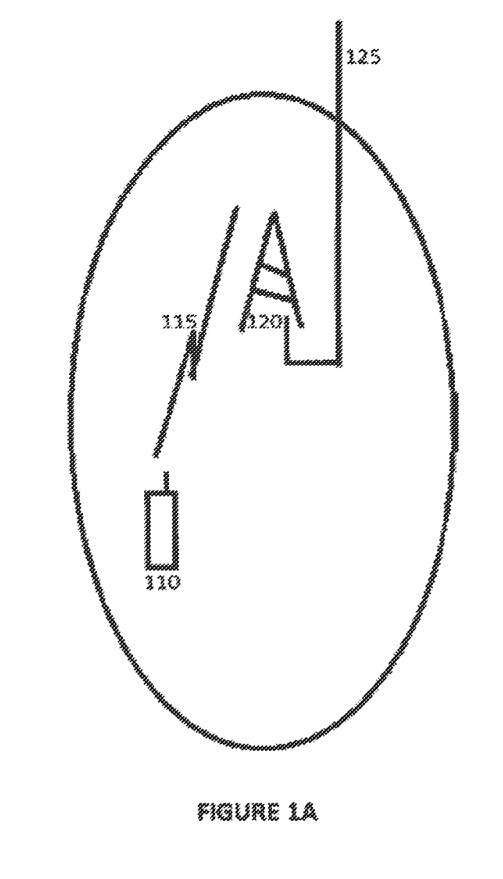
FIG. 1 illustrates an example system capable of supporting at least some embodiments of the invention.

FIG. 1 illustrates an example system capable of supporting at least some embodiments of the invention. In FIG. 1A a wireless embodiment is illustrated. Illustrated is mobile 110, which may comprise, for example, a user equipment, cellular telephone, laptop computer, tablet computer, personal digital assistant, PDA, or other mobile device with connectivity functions. Mobile 110 is illustrated as being in communication with base station 120 via wireless link 115. Base station 120 may be configured to operate in accordance with a cellular technology such as, for example, IS-95, wideband code division multiple access, WCDMA, or long term evolution, LTE. Wireless link 115 may perform in accordance with the same technology as base station 120, to provide interoperability between mobile 110 and base station 120. Base station 120 is illustrated as being in communication with further nodes of a cellular network via connection 125, which may be a wire-line connection or at least in part wireless. Further nodes may comprise other base stations, base station controller nodes or core network nodes, for example. Examples of core network nodes comprise switches, mobility management entities, gateways, subscriber information databases and subscription management servers.

Mobile 110 may be a M2M unit, such as a utility metering device. Mobile 110 may comprise at least one integrated module, such as a subscriber identity module, SIM, or an universal integrated circuit card, UICC.

Mobile 110 may comprise remote management functionality wherein an operator of a network in which base station 120 is comprised in may remotely install software on mobile 110. Remotely installing may comprise so-called over-the-air, OTA, updating wherein mobile 110 receives from a base station, such as for example base station 120, software over wireless link 115 and installs it to modify the functionality of mobile 110.

Figure 1B:
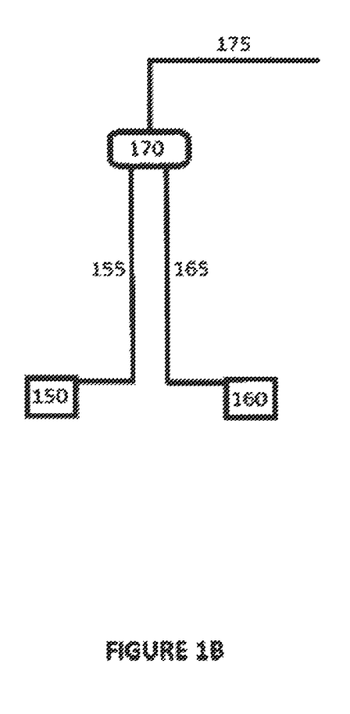

FIG. 1B illustrates a wire-line embodiment. Illustrated are devices 150 and 160, which may comprise, for example, M2M units comprised in a sensor network. Devices 150 and 160 may be configured to monitor electricity or water consumption in an apartment block or industrial process, for example. Device 150 is illustrated as being connected to node 170 via connection 155. Device 160 is illustrated as being connected to node 170 via connection 165. Connections 155 and 165 may be comprised in a sensor network, where node 170 may serve as a concentrator. Node 170 is illustrated as being connected to further entities, such as the internet or corporate network, via connection 175. Like mobile 110, devices 150 and/or 160 may comprise at least one integrated module, such as a subscriber identity module, SIM, and/or an UICC and/or an embedded UICC, eUICC, or eSIM. Like mobile 110, devices 150 and/or 160 may comprise remote management functionality enabling the devices to receive updated software via connections 155 and/or 165, respectively.

Remote management functionality may be comprised in an integrated module. For example, an integrated module in mobile 110 or device 150 may be replaced with a newer model, wherein the new integrated module may comprise remote management functionality. An integrated module may comprise that the module is at least in part physically insertable into an opening in mobile 110 or device 150, or that the module remains external to mobile 110 or device 150, but is connected thereto by a cable and an insertable connector, wherein the insertable connector may be at least in part inserted into an interface port comprised in mobile 110 or device 150, or that said interface port is at least in part inserted into the insertable connector. Examples of interface ports include RJ-45 ports, serial ports and proprietary ports. An integrated module so connected with a device may be considered to be insertably interfaced.

Where an integrated module not supporting remote management functionality is replaced with respect to a device with an integrated module supporting remote management functionality, a processing environment or circuitry in the new integrated module may determine, if the device into which it is interfaced requires or could benefit from updated software. An integrated module may be associated with a subscription, identity or owner of a device, such as mobile 110 or device 150. The integrated module may determine the device requires an update by requesting from the device information on software installed in the device. Such information may comprise information on programs installed in the device, and optionally also which versions at least some of the programs are. The integrated module may compare the received information with information stored in the integrated module to determine, if updating would be useful. For example, updating may be determined to be useful where the integrated module supports functionality the device doesn't support, and the functionality can be enabled in the device with updating. Examples of such functionalities include support for an encryption algorithm and support for a media codec. In general determining that updating would be useful may be based at least in part on the integrated module determining a version mismatch between at least one capability of the integrated module and at least one capability of the device.

Responsive to a determination that updating may be useful, or responsive to being interfaced with the device, the integrated module may request a connection to a server, such as for example a subscription management server. The connection to the server may be at least one of encrypted and authenticated using authentication information stored in the integrated module. A name or address of the server may be stored on the integrated module to enable the integrated module to request the connection. In some embodiments, the server is configured to provide the integrated module with contact information of a subscription management server. The integrated module may request the connection via the device, such as mobile 110 or device 150. The integrated module may request a connection to the subscription management server upon receiving from the server the contact information of the subscription management server. The integrated module may be an endpoint of the connection to the subscription management server, the subscription management server being the other endpoint. The connection may traverse either mobile 110 and wireless connection 115, or device 150 and connection 155, for example.

The integrated module may be configured to enable the device to form a connection to a network node, such that the device is an endpoint of the thus formed connection. Such enabling may comprise, for example, that the integrated module provides to the device information enabling the device to become an endpoint. An example of such enabling information is a uniform resource locator, URL, which the device may use to form a connection to the network node, which may be a server, which server may be, as one example, the subscription management server. Responsive to being provided an URL, the device may open a connection to the URL and interact with the network node acting as the other endpoint of the connection. Another example of enabling information is information that allows the connection between the network and the integrated module to be transferred so that the device becomes an endpoint of the connection.

The integrated module may have a first connection to the subscription management server and the device may have a second connection to the subscription management server. The second connection may be established with credentials obtained in the device from the integrated module. The integrated module may have obtained the credentials using the first connection from the subscription management server. By providing credentials via the integrated module and the first connection, the subscription management server may ensure the device requesting the second connection is a device associated with the integrated module.

Once connected to the device, the network node may offer the device a choice as to operator. A default operator may be chosen, for example an operator that has configured the integrated module, or a user of the device may select an operator. Where the user selects an operator that isn't in control or in collaboration with the network node, the network node may perform a re-directing function to direct the connection so the device may obtain an update, or at least information, from the selected operator.

The network node may determine what capabilities the device has, and/or which at least one capability the device should be updated with. Such capability may comprise a new software module, or an updated version of a software module already present in the device, or such capability may comprise an ability to perform a task. This determining may be based on, for example, a manual or automatic query, wherein a user or the device provides information to the network node. Alternatively, the device may be configured to provide to the network node an indication of an updating opportunity identified by the integrated module, the indication being conveyed from the integrated module to the device over the interface between the device and the integrated module. Alternatively, where the integrated module has a connection with the subscription management server and the device also has a connection with the network node, the network node comprising the subscription management server, the integrated module may advise the subscription management server of an updating opportunity using the connection between the integrated module and the subscription management server.

When the network node, which may be the subscription management server, has determined which at least one capability the device should be updated with, the network node may select an application which is compatible with the combination of device and integrated module. This may comprise selecting an application type and version that is compatible with a device version and an integrated module version. The selected application may be downloaded to the device, for example by sending to the device a link to a site where the application is downloadable, or by using an open mobile alliance, OMA, Device Management procedure, for example or an extended SIM OTA server procedure. In some embodiments, the integrated module is updated with new software, for example to enable interoperability with new software on the device. Following the update, the network node may mark the device, and optionally also the integrated module, as updated to prevent another updating process from being triggered.

Using updated software, the device and integrated module may exchange information, such as encrypted information, and the device may be enabled to control the integrated module. Controlling the integrated module may comprise, for example, causing a subscription transfer procedure to occur wherein information of the integrated module is copied into the device for transferring it further. Controlling the integrated module may comprise, for example, forming an end-to-end connection between two integrated modules, for example ones in devices 150 and 160, to transfer a profile or a subscription from one integrated module to another.

In some embodiments, a device noticing that an integrated module is interfaced with the device, is configured to responsively seek software needed to interoperate with the integrated module from a network server, such as for example a subscription management server.

In general there is provided an apparatus, such as for example a device such as mobile 110 or device 150. The apparatus may comprise a transceiver arranged to insertably interface with an integrated module. The transceiver may comprise a port arranged to at least in part accept the integrated module, or a connector for interfacing with the integrated module. The apparatus may comprise at least one processing core configured to enable the integrated module to be connected, via the apparatus, to a network. For example, the at least one processing core may be comprised in a processor, digital signal processor or a chipset. Enabling the connection may comprise enabling the connection via the transceiver and a network interface of the apparatus. The transceiver may be configured to receive from the integrated module information enabling the apparatus to become an endpoint of a connection to a network node. The information may comprise a URL to the network node, for example. The at least one processing core may be configured to receive, using the connection to the network node, a computer program for the apparatus. The computer program may comprise a software update, for example.

In some embodiments, the at least one processing core is configured to receive, using the connection to the network node or a second connection, a computer program for operating the integrated module. Such a computer program may enable the apparatus to control the integrated module, for example. Alternatively such a computer program may be delivered to the integrated module by the apparatus, to update software in the integrated module.

In some embodiments, the at least one processing core is configured to provide to the network node information concerning at least one of the apparatus and the integrated module. Such information may comprise, for example, information of capabilities of the apparatus and/or the integrated module, or information on software installed in of the apparatus and/or the integrated module. Information on software may comprise information on software versions.

In general there is provided an integrated module, comprising a transceiver arranges to insertably interface with a terminal device. The integrated module may comprise a UICC, eUICC or SIM, for example. The terminal device may comprise a device such as, for example, mobile 110 or device 150. The transceiver may comprise a port arranged to at least in part be inserted into the terminal device, or be operably connected to a connector for interfacing with the terminal device. The integrated module may further comprise processing circuitry configured to request a connection from the integrated module to a subscription management server via the terminal device. Requesting the connection may comprise transmitting a request message via the transceiver to the terminal device. The transceiver may be configured to provide to the terminal device information enabling the terminal device to become an endpoint of a connection to a network node, wherein the information is at least in part based on first information received in the integrated module from the subscription management server. The information provided to the terminal device may comprise a URL, for example. The integrated module may be configured to decide based on an interaction with the subscription management server and on an interaction with the terminal device, to provide the information to the terminal device. The information may be provided to trigger an updating procedure in the terminal device.

In some embodiments, the processing circuitry is comprised in a secure execution environment in the integrated module. A examples of a secure execution environment include an ARM TrustZone Chip, Trusted Computing Group certified security chip and a Global Platform certified security chip. In some embodiments, the processing circuitry is configured to provide the information at least in part responsive to a determination, taken in the processing circuitry, that the terminal device doesn't support a first capability. Examples of such a capability include an encryption algorithm and a codec. In some embodiments, the integrated module comprises a secure device.

Figure 3:
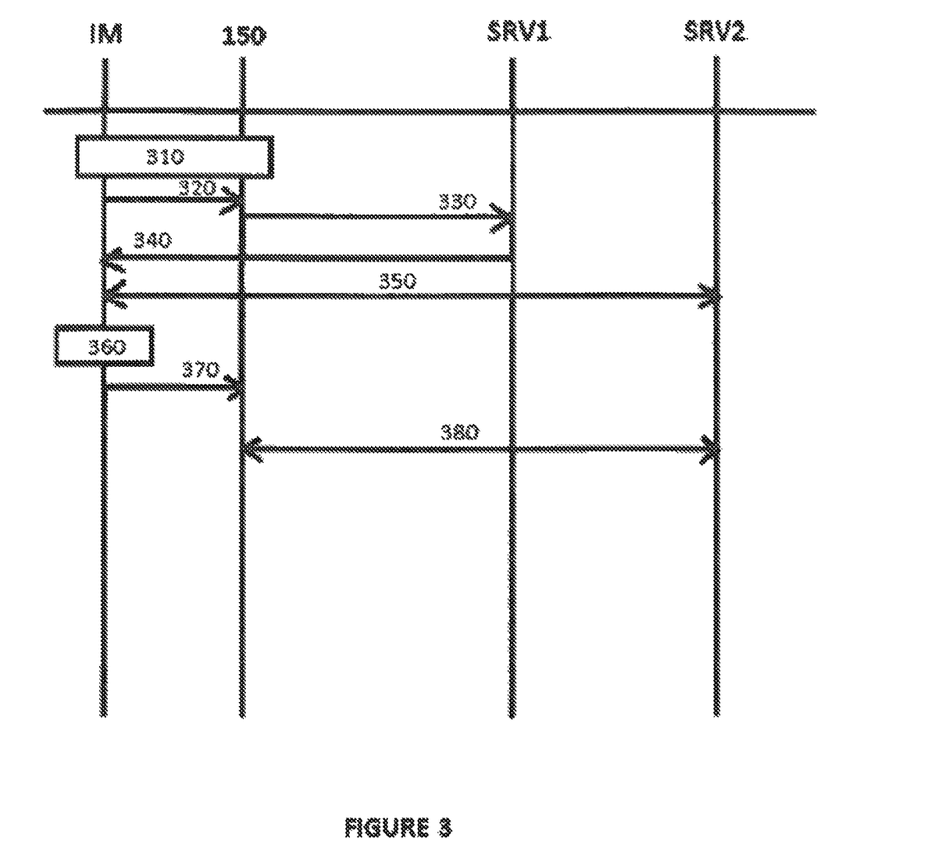
FIG. 3 is a flow diagram showing signaling relating to an example embodiment of the invention.

FIG. 3 is a flow diagram showing signaling relating to an example embodiment of the invention. On the vertical axes are illustrated, from left to right, integrated module, IM, device, 150, for example device 150 or mobile 110 from FIG. 1, a first server, SRV1, and a subscription management server, SRV2.

In phase 310, the integrated module is insertably interfaced with device 150. In phase 310 the integrated module and device 150 may become aware of each other and initiate a connection, for example a local connection, between them. In phase 320, the integrated module may request a connection to server SRV1 via device 150, for example by transmitting a connection request to device 150. The connection request may comprise an identity, such as a address or URL, of server SRV1. The identity of server SRV1 may be preconfigured in the integrated module prior to phase 310. In phase 330, device 150 may transmit a connection request to server SRV1. The connection request of phase 330 may comprise at least one of an identity of the integrated module and an identity of device 150. Server SRV1 may comprise a redirect server. In phase 340, server SRV1 may inform the integrated module of contact information, such as for example a URL, domain name or address, of server SRV2. Server SRV2 may comprise a subscription management server, for example. In some embodiments, the identity of server SRV2 may be pre-configured in the integrated module, and phases 320 through 340 may be absent, and the integrated module in those embodiments may request a connection to server SRV2 without requesting a connection to server SRV1 first. The message of phase 340 may be conveyed via device 150.

In phase 350, the integrated module forms an end-to-end connection to server SRV2 via device 150. Information is communicated over the end-to-end connection through device 150, but device 150 isn't an endpoint of this connection. In phase 360 the integrated module decides, whether to trigger an updating procedure for device 150 and/or the integrated module. As input for the decision of phase 360, the integrated module may request and receive software and version information from device 150. Input for the decision of phase 360 may comprise input received from server SRV2. If a decision to trigger updating is made, processing proceeds to phase 370. If a decision is taken that no updating is to be done, processing ends in phase 360. Phase 360 is optional, and where phase 360 is absent, processing proceeds from phase 350 to phase 370.

In phase 370, the integrated module may provide to device 150 information enabling device 150 to become an endpoint of a connection, for example a connection to server SRV2. The information may comprise, for example, a URL or address of server SRV2. In phase 380, device 150 responsively forms an end-to-end connection with server SRV2 and performs updating by interacting with server SRV2, as described above in connection with the device interacting with a subscription management server.

Figure 4:
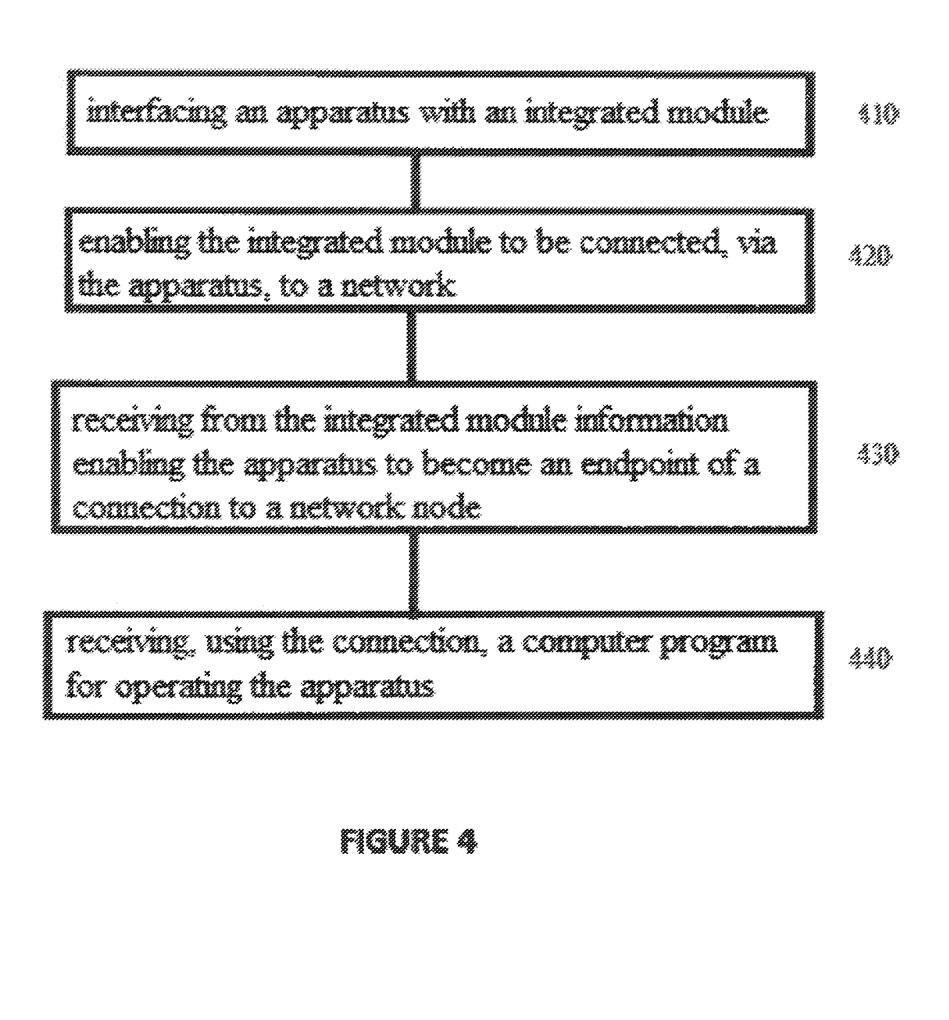
FIG. 4 is a flow diagram illustrating a first method in accordance with at least some embodiments of the invention.

FIG. 4 is a flow diagram illustrating a first method in accordance with at least some embodiments of the invention. The phases of the method illustrated in FIG. 4 may be performed, for example, in a device such as device 150 or mobile 110. Phase 410 comprises interfacing an apparatus with an integrated module. The interfacing may comprise insertably interfacing using a local interface, wherein the integrated module may be at least in part inserted into the apparatus as described above. Phase 420 comprises enabling the integrated module to be connected, via the apparatus, to a network. Phase 430 comprises receiving from the integrated module information enabling the apparatus to become an endpoint of a connection to a network node; and finally phase 440 comprises receiving, using the connection, a computer program for operating the apparatus.

Figure 5:
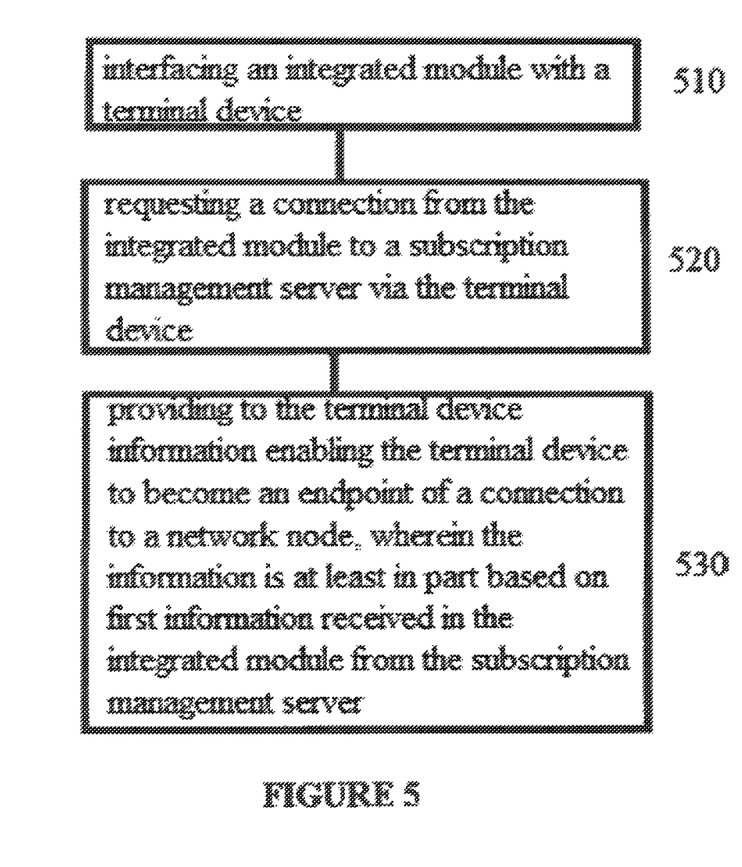
FIG. 5 is a flow diagram illustrating a second method in accordance with at least some embodiments of the invention.

FIG. 5 is a flow diagram illustrating a second method in accordance with at least some embodiments of the invention. The phases of the method illustrated in FIG. 5 may be performed, for example, in a device such as an integrated module as described above. Phase 510 comprises interfacing an integrated module with a terminal device. Phase 520 comprises requesting a connection from the integrated module to a subscription management server via the terminal device. Finally, phase 530 comprises providing to the terminal device information enabling the terminal device to become an endpoint of a connection to a network node, wherein the information is at least in part based on first information received in the integrated module from the subscription management server.

Figure 2:
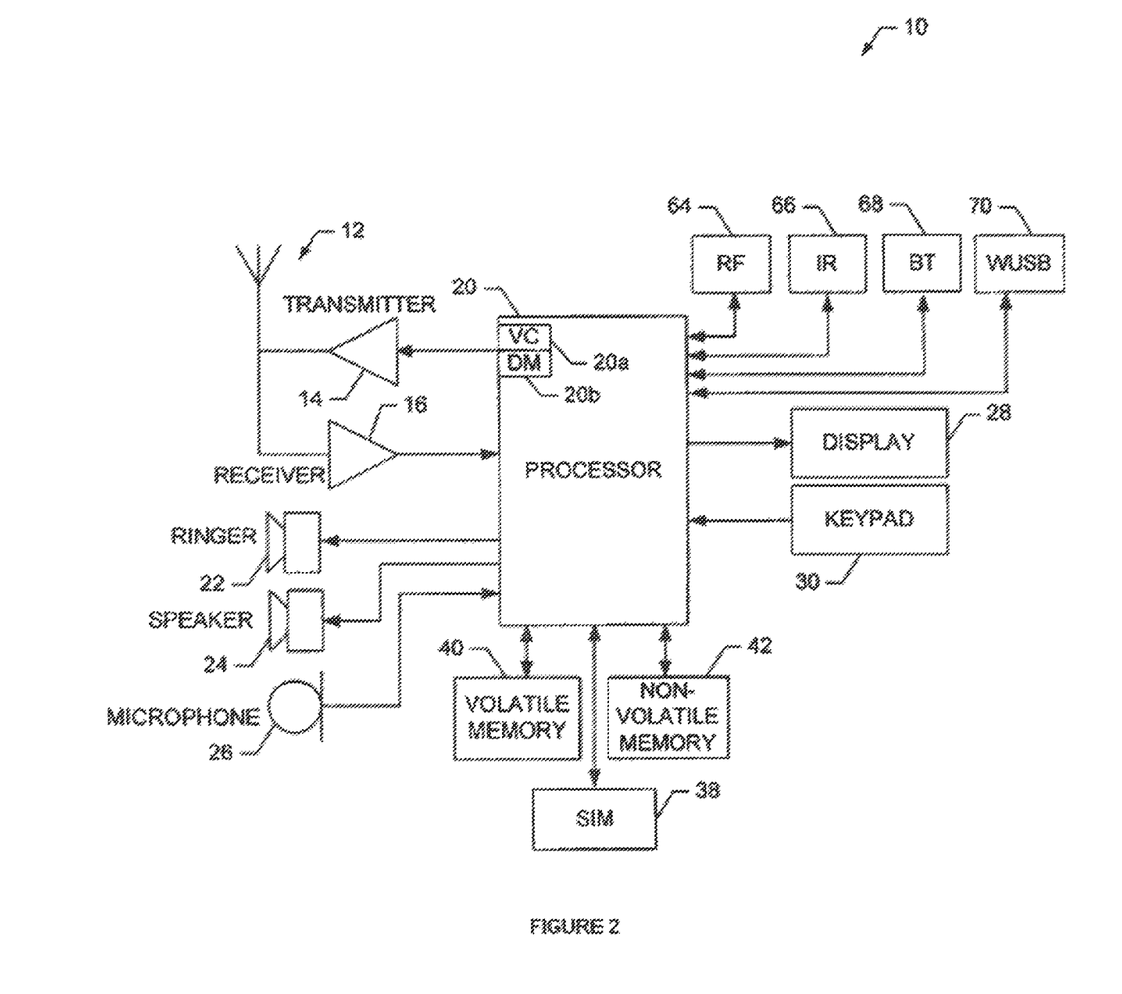
FIG. 2 illustrates a block diagram of an apparatus in accordance with an example embodiment of the invention.

FIG. 2 illustrates a block diagram of an apparatus 10 such as, for example, a mobile terminal or device 150, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi or Bluetooth, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1 G, second generation, 2 G, 2.5 G, third-generation, 3 G, communication protocols, fourth-generation, 4 G, communication protocols, Internet Protocol Multimedia Subsystem, IMS, communication protocols, for example, session initiation protocol, SIP, and/or the like. For example, the apparatus may be capable of operating in accordance with 2 G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5 G wireless communication protocols General Packet Radio Service. GPRS, Enhanced Data GSM Environment, EDGE, and/or the like. Further, for example, the apparatus may be capable of operating in accordance with 3 G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9 G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4 G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, Bluetooth, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory, such as at least one integrated module, such as UICC or eUICC. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, or certificate, capable of uniquely identifying apparatus 10.

Without in any way limiting the scope, interpretation, or application of the claims appearing below, a technical effect of one or more of the example embodiments disclosed herein is that updating a legacy device is enabled by using an integrated module. Another technical effect of one or more of the example embodiments disclosed herein is that secure device management is enabled by distributing integrated modules. Another technical effect of one or more of the example embodiments disclosed herein is software versions in integrated modules and devices may be aligned by selective updating.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a transceiver arranged to insertably interface with an integrated module;
at least one processing core configured to enable the integrated module to be connected, via the apparatus, via a first end-to-end connection which traverses a wireless connection, to a network node such that the apparatus is not an endpoint of the first end-to-end connection;
the transceiver being configured to receive from the integrated module information the apparatus can use in becoming an endpoint of a second end-to-end connection to the network node, the information being based on first information received in the integrated module over the first end-to-end connection, the information the apparatus can use in becoming the endpoint of the second end-to-end connection comprising credentials; and
the at least one processing core being configured to establish, using the information, the second end-to-end connection and to receive, using the second end-to-end connection, over-the-air, a computer program for operating the apparatus.

2. An apparatus according to claim 1, wherein the at least one processing core is further configured to provide to the network node information concerning at least one of the apparatus and the integrated module.

3. An apparatus according to claim 1, wherein the apparatus comprises a mobile communication device, the apparatus further comprising an antenna coupled to a radio transceiver and configured to provide signals to the at least one processing core.

4. A method, comprising:
interfacing an apparatus with an integrated module;
enabling the integrated module to be connected, via the apparatus, via a first end-to-end connection which traverses a wireless connection, to a network node such that the apparatus is not an endpoint of the first end-to-end connection;
receiving from the integrated module information the apparatus can use in becoming an endpoint of a second end-to-end connection to the network node, the information being based on first information received in the integrated module over the first end-to-end connection, the information the apparatus can use in becoming the endpoint of the second end-to-end connection comprising credentials; and
establishing, using the information, the second end-to-end connection and receiving, using the second end-to-end connection, over-the-air, a computer program for operating the apparatus.

5. A method according to claim 4, further comprising providing to the network node information concerning at least one of the apparatus and the integrated module.

* * * * *